United States Patent
Williams et al.

(10) Patent No.: US 8,037,528 B2
(45) Date of Patent: Oct. 11, 2011

(54) ENHANCED SERVER TO CLIENT SESSION INSPECTION

(75) Inventors: Craig Allen Williams, Pflugerville, TX (US); Gerald S. Lathem, Elgin, TX (US)

(73) Assignee: Cisco Technology, Inc., San Jose, CA (US)

( * ) Notice: Subject to any disclaimer, the term of this patent is extended or adjusted under 35 U.S.C. 154(b) by 331 days.

(21) Appl. No.: 11/856,562

(22) Filed: Sep. 17, 2007

(65) Prior Publication Data
US 2008/0098477 A1 Apr. 24, 2008

(51) Int. Cl.
*G06F 11/00* (2006.01)
*G06F 12/14* (2006.01)
*G06F 12/16* (2006.01)
*G08B 23/00* (2006.01)

(52) U.S. Cl. .......... 726/22; 380/269; 380/217; 380/236; 380/270; 709/246; 709/247; 709/203; 709/217; 709/219; 705/51; 705/52; 705/53; 705/54; 726/3; 726/12; 726/23; 726/26; 370/351; 713/153; 713/154; 713/170; 713/187; 713/188

(58) Field of Classification Search .................. 713/151, 713/153, 154, 188, 170, 187; 726/11, 22, 726/23, 3, 12; 709/246, 247; 380/217, 236, 380/269, 270
See application file for complete search history.

(56) References Cited

U.S. PATENT DOCUMENTS

| | | | |
|---|---|---|---|
| 5,724,261 A * | 3/1998 | Denny et al. ............. | 702/184 |
| 6,772,345 B1 * | 8/2004 | Shetty ..................... | 726/24 |
| 7,269,854 B2 * | 9/2007 | Simmons et al. ......... | 726/29 |
| 7,386,046 B2 * | 6/2008 | Fallon et al. ............. | 375/240 |
| 2002/0169954 A1 * | 11/2002 | Bandini et al. .......... | 713/153 |
| 2003/0115479 A1 * | 6/2003 | Edwards et al. ......... | 713/200 |
| 2003/0196098 A1 * | 10/2003 | Dickinson et al. ....... | 713/188 |
| 2005/0172337 A1 * | 8/2005 | Bodorin et al. .......... | 726/22 |
| 2006/0031407 A1 * | 2/2006 | Dispensa et al. ........ | 709/219 |
| 2006/0112174 A1 * | 5/2006 | L'Heureux et al. ...... | 709/223 |
| 2007/0025374 A1 * | 2/2007 | Stefan et al. ............ | 370/401 |
| 2007/0261112 A1 * | 11/2007 | Todd et al. .............. | 726/11 |
| 2008/0034424 A1 * | 2/2008 | Overcash et al. ........ | 726/22 |

OTHER PUBLICATIONS

Request for Comments (RFC) 2616, Fielding, et al., Jun. 1999, http://www.w3.org/Protocols/rfc2616/rfc2616.html.*
Dr. Igor G. Muttik, "Scanning on the Wire," Virus Bulletin Conference Oct. 2006: pp. 120-125.

* cited by examiner

*Primary Examiner* — April Shan
(74) *Attorney, Agent, or Firm* — Patterson & Sheridan, LLP

(57) ABSTRACT

In one embodiment, a technique for enhancing the inspection of data sent from a server is provided. By modifying a client request in an effort to prevent the transformation (e.g., encoding and/or compression) of data by the server, unencoded data may be received, which can be inspected without the overhead associated with first decoding the data. Further, in the event the data is encoded despite modifying the client request to prevent such encoding, the server may be untrustworthy and one or more appropriate actions may be taken.

12 Claims, 5 Drawing Sheets

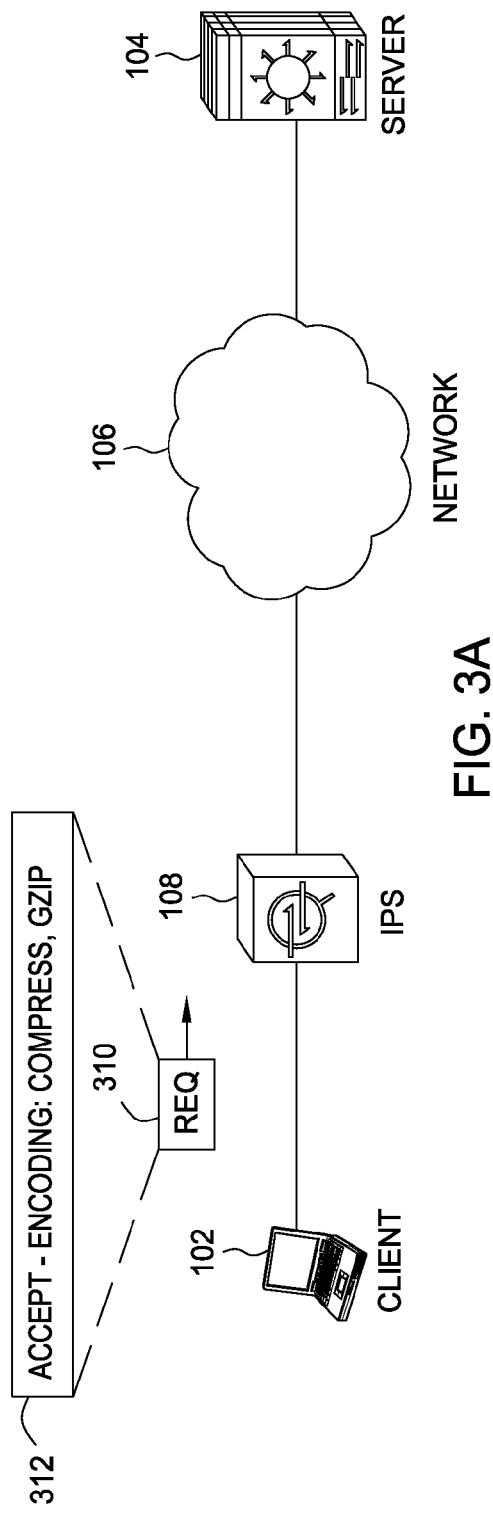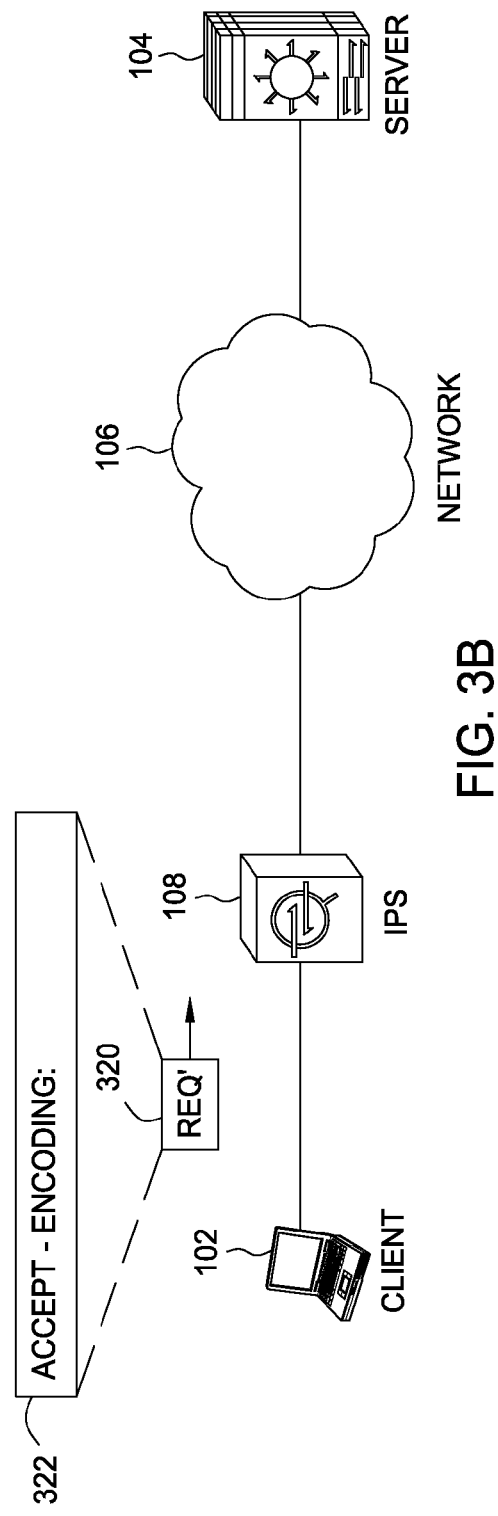

ENHANCED SERVER TO CLIENT SESSION INSPECTION

BACKGROUND OF THE INVENTION

1. Field of the Invention

Embodiments of the present invention generally relate to network security.

2. Description of the Related Art

Some network protocols, such as certain versions of Hypertext Transfer Protocol (HTTP), allow for the transparent use of compression and encoding algorithms in sessions between a client and server. Because certain data, such as web pages, tend to compress well, the use of compression may significantly improve network performance, while the use of encoding (e.g., in encryption algorithms) is important in maintaining security.

As a result, however, current network security devices, such as intrusion protection systems (IPSs) face the problem that a server can send malicious traffic compressed and/or encoded to a "victim" client. Writers of such malicious content can exploit the fact that many IPS devices cannot inspect encoded or compressed HTTP sessions. In order to inspect such traffic, an ISP would have to first decompress/decode the traffic for inspection, which may not be feasible at high speeds.

Accordingly, what is needed is an improved technique for inspecting server to client traffic in a session.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3D illustrate traffic flow through the example topology of FIG. 1 in which a server complies with a request to disable compression/encoding, in accordance with embodiments of the present invention.

DESCRIPTION OF EXAMPLE EMBODIMENTS

Embodiments of the present invention allow for the efficient inspection of server to client traffic during a network session. An inspection device may modify a header in a client request in an effort to prevent encoding and/or compression of data sent from the server. As a result, the inspection device may receive unencoded and uncompressed data that it may inspect without the overhead of decoding and decompression. If the server sends data that is encoded and/or compressed despite the modified client request, the server may be sending malicious data and the inspection device may take appropriate action.

Embodiments of the present invention will be described below with reference to examples of inspecting traffic in Hypertext Transfer Protocol (http) sessions. However, those skilled in the art will recognize that the http is merely an example of one type of network protocol that supports encoding and compression and will appreciate that the techniques described herein may be applied to any type of network protocol that allows encoding and compression to be enabled and disabled in client requests.

Embodiments of the present invention will be described below with reference to an in-line device (positioned between a client and server) that performs inspection of traffic as described herein. However, those skilled in the art will recognize that the techniques described herein may also be performed by a device positioned at a different location, such as a component that is part of a client.

An Example Network Environment

Figure 1:
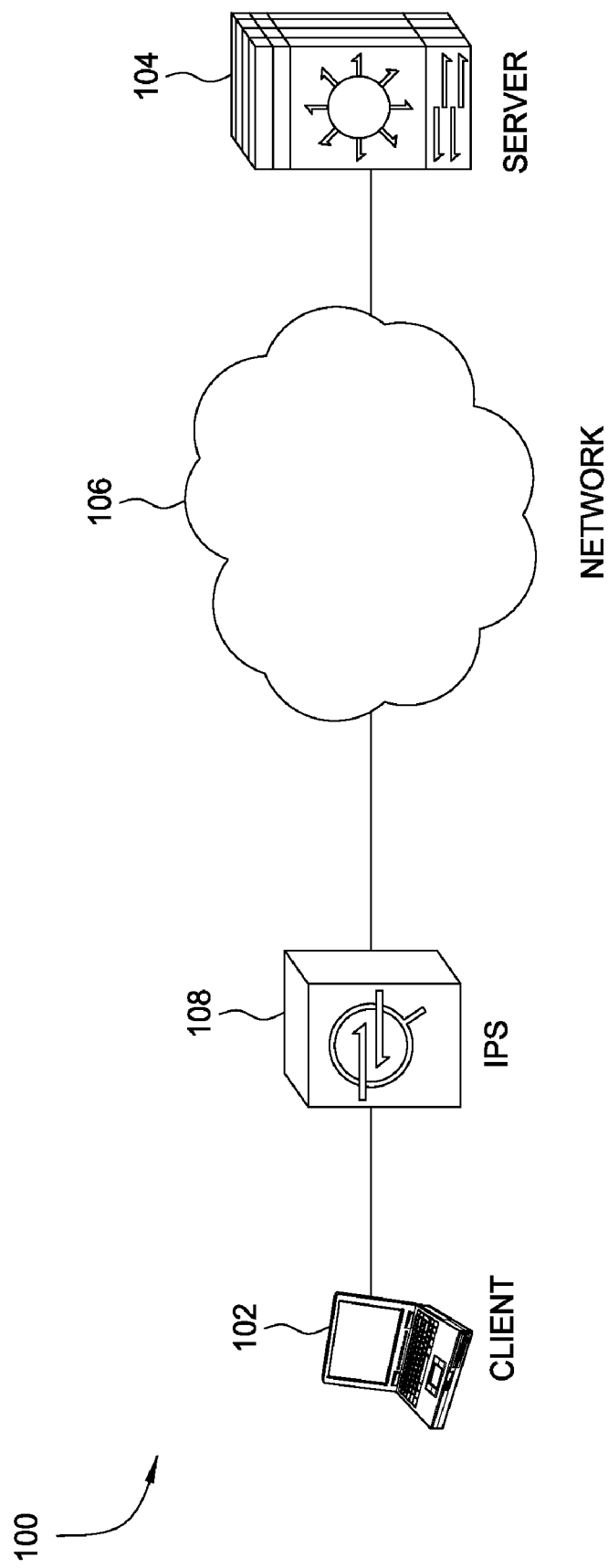
FIG. 1 illustrates an example network topology in accordance with embodiments of the present invention.

FIG. 1 illustrates one example of a network environment 100 in which embodiments of the present invention may be utilized. The environment generally includes a client 102 that communicates with a server 104 via a network 106. The network 106 may be include any combination of suitable elements to route traffic between the client 102 and server 104, including a "fabric" of network nodes, such as switches and routers. The network 106 may be include a company Intranet or the Internet.

An intrusion prevention system (IPS) device 108, or other type of inspection device, may be utilized to monitor traffic between the client and server during a session. As illustrated, the IPS device 108 may be located between the network 106 and client 102, which allows it to monitor traffic between the client 102 and any server the client 102 communicates with over the network 106. Further, for some embodiments, the IPS device 108 may be positioned at the attachment point of a local network (e.g., a company Intranet) to the network 106, allowing the IPS device 108 to monitor traffic between multiple clients of the local network and servers via the network 106.

As previously described, if encoding and/or compression are enabled in a session between the client 102 and server 104, the IPS device 108 would first have to decode and/or decompress the traffic in order to inspect it. To facilitate the following description, the generic term "encoding" will be used to refer collectively to any form of transforming data, including encryption, compression, or a combination thereof, while the generic term "decoding" will be used to collectively refer to any type of decoding, decryption, decompression, or a combination thereof.

If some form of encoding is enabled for a session, the additional overhead associated with decoding traffic for inspection may have a significant adverse impact on network traffic. For some embodiments, however, the IPS device 108 may be configured to overcome some of this adverse impact and enable enhanced inspection of session traffic.

Figure 2:
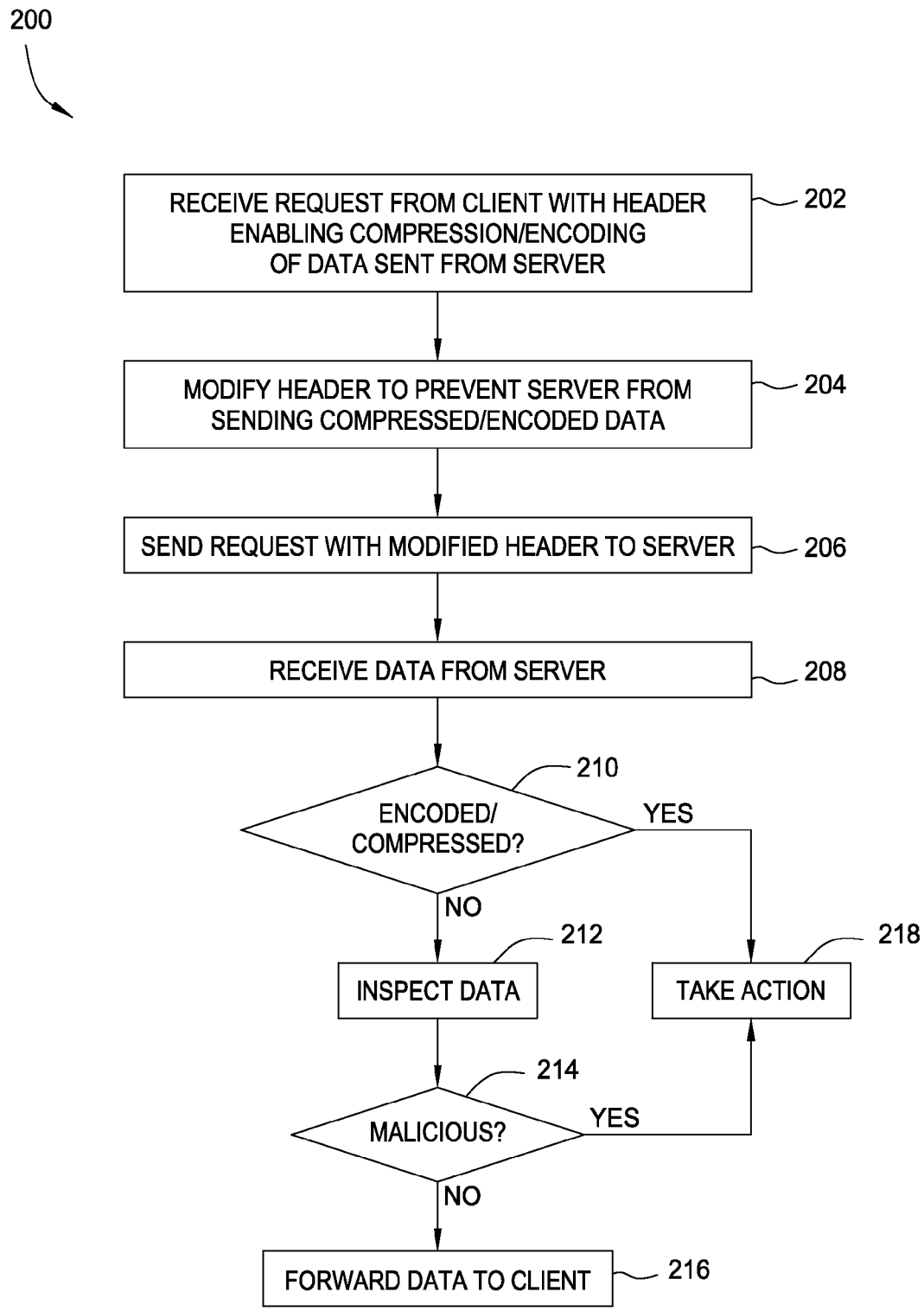
FIG. 2 is a flow diagram of example operations in accordance with embodiments of the present invention.

FIG. 2 illustrates example operations 200 that may be performed by the IPS device 108 to achieve enhanced traffic inspection. The operations may be described with reference to FIGS. 3A-3D and FIGS. 4A and 4B, which illustrate example session traffic inspected by the IPS device 108.

The operations begin, at step 202, when the IPS device receives a request from a client enabling encoding in session traffic. Exactly how encoding is enabled may depend on the particular protocol being used in a session. For example, as illustrated in FIG. 3A, in an HTTP session a client request 310 may have an "Accept-Encoding" header line 312 with fields that specify what types of encoding will be allowed. In the illustrated example, if the request 310 were allowed to reach the server 108, the Accept-Encoding line 312 would indicate that "compression" and "gzip" encoding is allowed for the session.

At step 204, however, the IPS device modifies the client request in an effort to prevent the server from sending encoded data. For example, as illustrated in FIG. 3B, the IPS device 108 may modify the request 310 to remove the fields in the Accept-Encoding header line 312. The resulting modified request 320 may have either no fields listed in its Accepted-Encoding header line 322, as shown. As an alternative, the IPS device 108 may remove the Accepted-Encoding header line altogether, or disable all listed forms of encoding (e.g., by specifying a zero "qvalue").

Figure 3C:
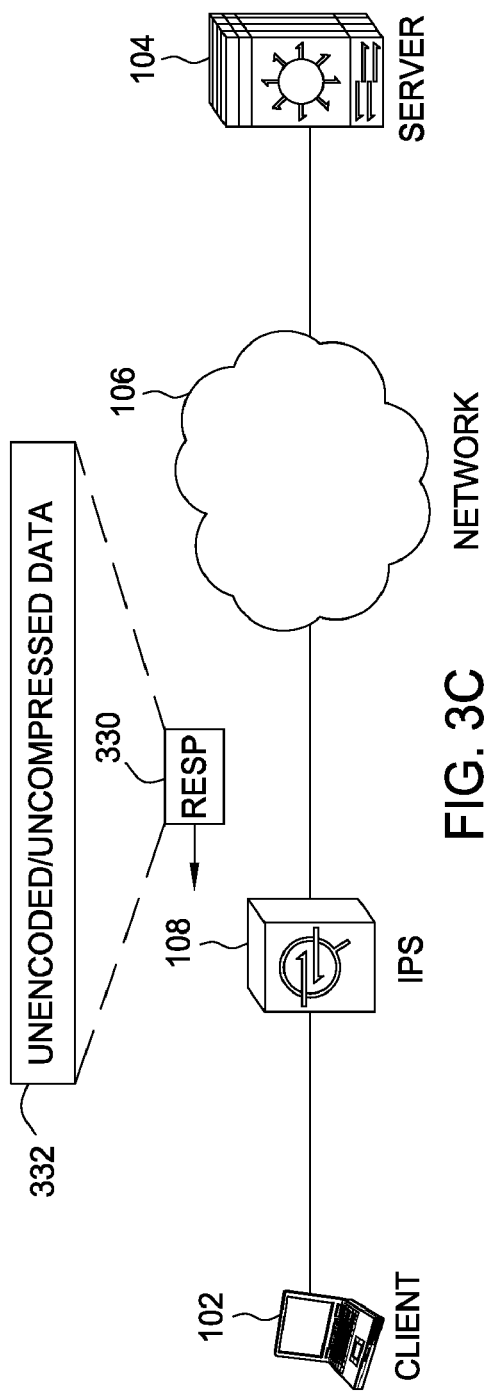

At step 206, the IPS device sends the modified request to the server. At step 208, the IPS device receives (response) data from the server. At step 210, the IPS device determines whether or not the data is encoded. If the server complies with the request (e.g., honors the request for no encoding), the data received from the server will be unencoded. FIG. 3C illustrates a server response 330 with unencoded data 332.

Figure 3D:
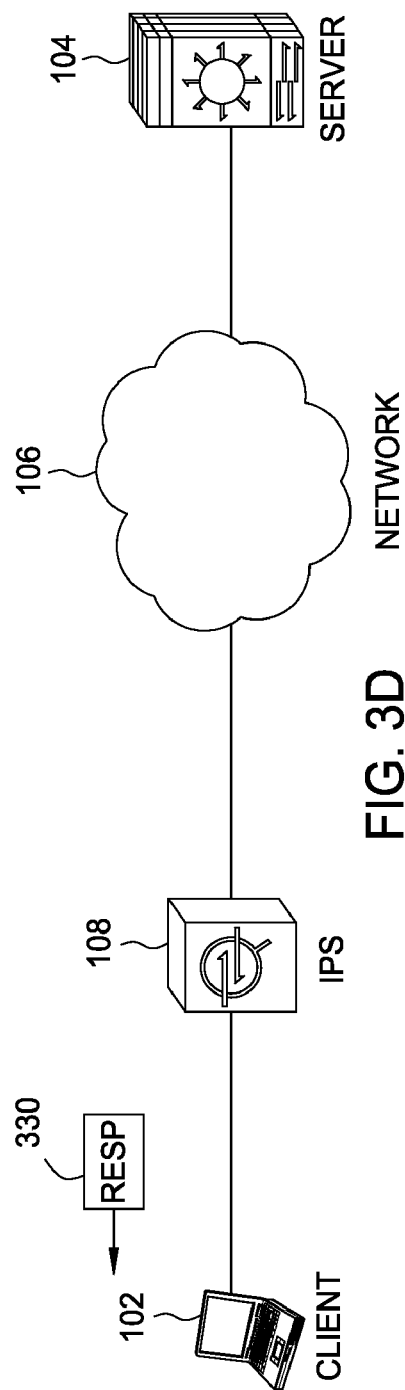

If the data is not encoded, the IPS device can proceed to inspect the data, at step 212. The inspection may involve any known or proprietary type of inspection, for example, using pattern matching corresponding to known malicious attacks. If the results of the inspection indicate the data is not malicious, the IPS device forwards the data to the client, at step 216. As illustrated in FIG. 3D, the IPS device 108 forwards the response 330, as received from the server, to the client 102 without modification.

In expected operation, modifying the client request to remove encoding requests should result in the server sending back requested data in an unencoded (uncompressed and unencrypted) form which may be easily inspected. To comply with some versions of HTTP, servers must support the lack of encoding since some browsers cannot support it.

Therefore (referring back to step 210), if the server response contains encoded data despite the request for no encoding in the modified request sent from the IPS device, it may be an indication that the server can not be trusted. If the response contains encoded data, some type of action may be taken, at step 218.

The type of action taken may vary depending on the particular embodiment and/or depending on the particular configuration of the IPS device 108. For example, the IPS device 108 may be configured to simply block the response, and not send it to the client 102. For some embodiments, the response may be stored (e.g., quarantined) and some type of notification may be generated, such as an e-mail to an administrator.

For some embodiments, the IPS device 108 may decode the data and inspect it. If the results of the inspection indicate the data is not malicious (despite the unrequested encoding), the IPS device 108 may forward the response on to the client. If the results of the inspection indicate the data is malicious, however, the IPS device 108 may block the response from reaching the client 102.

Figure 4A:
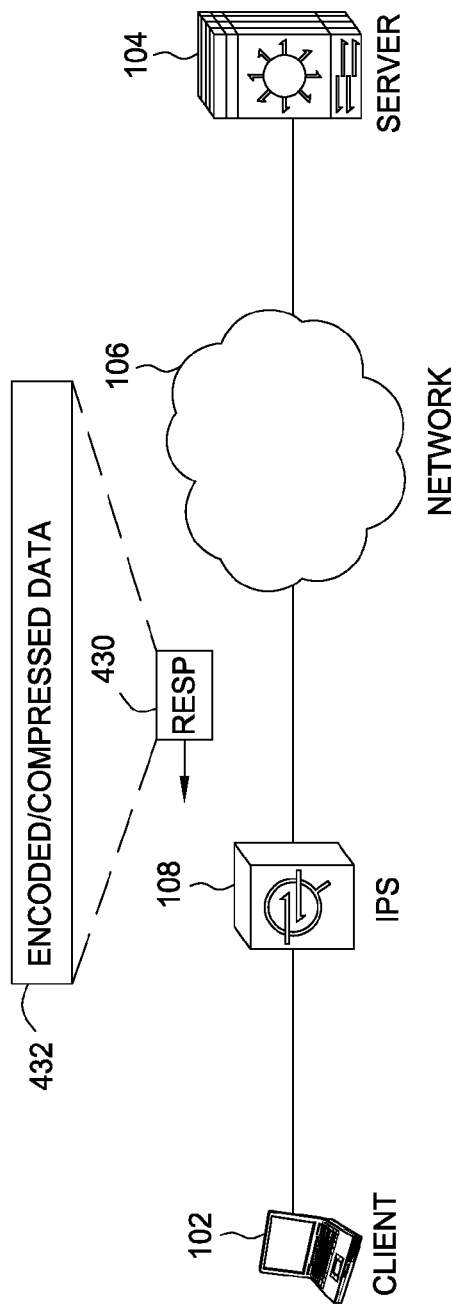
FIGS. 4A and 4B illustrate traffic flow through the example topology of FIG. 1 in which a server does not comply with a request to disable compression/encoding, in accordance with embodiments of the present invention.
Figure 4B:
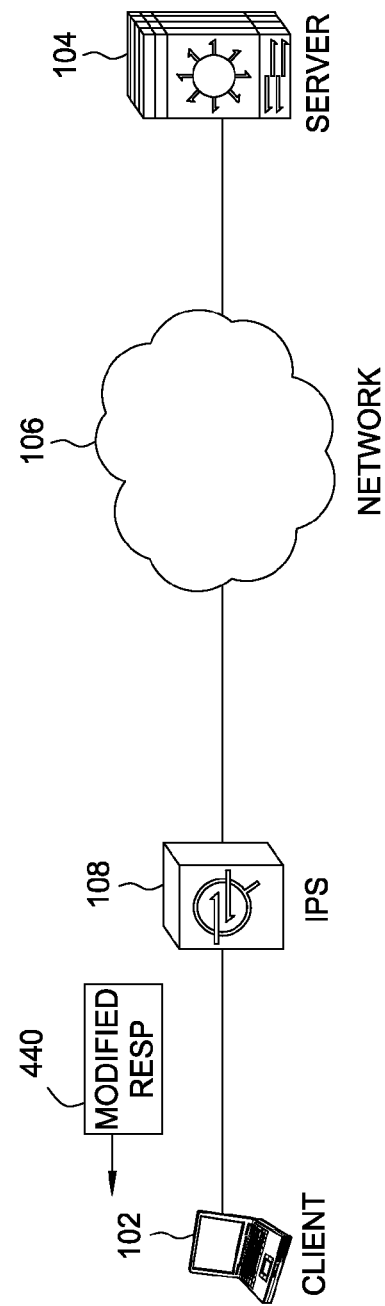

For some embodiments, the IPS device 108 may be configured to modify (or "clean") the response, for example, to remove attachments or other data that was encoded or, when decoded, revealed suspect material. This scenario is illustrated in FIGS. 4A and 4B, in which the IPS device 108 receives a response 430 from the server 104 that has encoded data 432. The IPS device 108 modifies the response (e.g., removing suspect portions) and forwards the modified response 440 to the client 102.

For some embodiments, the IPS device 108 may be configurable, allowing a user (e.g., an administrator) to select one or more actions to take, for example, via a graphical user interface (GUI) screen. For example, the user may be able to specify what actions to take, appropriate personnel that should be notified (e.g., via phone number or e-mail address) in the event a suspect response is received from server. Once the selections are made, instructions may be sent to the IPS device, for example, via a command line interface (CLI) to configure it according to the selected options.

The techniques described herein may be utilized to enhance inspection of server to client traffic. By modifying outbound requests (e.g., HTTP requests), an intrusion prevention system may prevent encoding, allowing for inspection of data which may not otherwise be inspected without the substantial overhead involved in decoding. Further, the mere receipt of encoded data from a server despite a request to not use encoding may identify a server as untrustworthy.

The examples above described removing all requests for encoding, for example, by removing all fields in an Accept Encoding header line or removing the Accept Encoding header line altogether. However, for some embodiments, similar techniques may be applied while still allowing one or more specified forms of encoding. For example, rather than modify a client request to prevent all forms of encoding, the IPS device may modify the request to prevent only some forms of encoding. If the server response contains data that is unencoded or data that is encoded using one of the allowed forms of encoding, the IPS device may forward the response to the client (possibly decoding and inspecting it first). On the other hand, if the server response contains data that is encoded in a form that was not indicated in the request, the IPS device may take action as described above. Such flexibility may allow some forms of encoding (e.g., that have not been associated with known malicious attacks) while preventing others.

As previously described, for embodiments, the operations described herein may performed at a client (e.g., by a client component rather than a separate IPS device). In such embodiments, upon detecting encoded data and/or malicious content, a client component performing the inspection may take actions to remove the malicious content or prevent the response data from being forwarded on (e.g., to a downstream component), for example, depending the component configuration.

While the foregoing is directed to embodiments of the present invention, other and further embodiments of the invention may be devised without departing from the basic scope thereof, and the scope thereof is determined by the claims that follow.

What is claimed is:

1. A method comprising:
   receiving, by an inspection device positioned in a network between a client and a server, a request from the client for response data from the server, the request including a specification of one or more forms of transforming the response data sent by the server in response to the request, wherein the one or more forms of transforming comprise at least one of encrypting the response data or compressing the response data;
   modifying, by the inspection device, the request in a manner designed to prevent the server from transforming the response data in accordance with the specification;
   sending, by the inspection device, the modified request to the server;
   receiving, by the inspection device, the response data from the server;

determining, by the inspection device, if the response data is transformed in accordance with the specification despite the modification of the request;

if the response data is not transformed in accordance with the specification, inspecting, by the inspection device, the response data for malicious content; and if the response data is transformed in accordance with the specification, concluding, by the inspection device, the server is untrustworthy and taking one or more predetermined actions.

2. The method of claim 1, further comprising, if the response data is not transformed in accordance with the specification and malicious content is found in the response data, removing the malicious content from the response data prior to forwarding the response data.

3. The method of claim 1, further comprising, if the response data is not transformed in accordance with the specification and malicious content is found in the response data, preventing the response data from being forwarded.

4. The method of claim 1, wherein:

the specification comprises one or more fields in a Hypertext Transfer Protocol (HTTP) header; and modifying the request in a manner designed to prevent the server from transforming the response data in accordance with the specification comprises at least one of modifying or deleting the fields.

5. The method of claim 1, wherein taking one or more predetermined actions comprises preventing the response data from reaching the client.

6. The method of claim 1, wherein taking one or more predetermined actions comprises decoding the response data to generate untransformed response data and inspecting the untransformed response data.

7. The method of claim 6, further comprising:

detecting malicious content in the untransformed response data;

modifying the response data to remove the malicious content; and forwarding the modified response data.

8. A method comprising:

receiving, by an inspection device positioned in a network between a client and a server, a request from the client, the request including a specification of one or more forms of transforming response data sent by the server in response to the request, wherein the one or more forms of transforming comprise at least one of encrypting the response data or compressing the response data;

modifying, by the inspection device, the request to remove at least one of the forms of transforming from the specification;

sending, by the inspection device, the modified request to the server;

determining, by the inspection device, if the response data is transformed in accordance with the specification despite the modification of the request;

inspecting, by the inspection device, the response data from the server for malicious content if the response data is not transformed or is transformed using a form of transforming specified in the modified request; and concluding, by the inspection device, the server is untrustworthy and taking one or more predetermined actions if the response data is transformed using a form of transforming that is not specified in the modified request.

9. The method of claim 8, wherein:

the specification comprises one or more fields in a Hypertext Transfer Protocol (HTTP) header; and modifying the request comprises at least one of modifying or deleting the fields in the HTTP header.

10. The method of claim 8, wherein taking one or more predetermined actions comprises decoding the response data and inspecting the decoded response data.

11. The method of claim 8, wherein taking one or more predetermined actions comprises sending a notification to a user.

12. The method of claim 11, further comprising receiving an identification of the user via an interface.

* * * * *